P. A. GUYE.
PROCESS OF RECOVERING NITROUS VAPORS OR OXIDS OF NITROGEN DILUTED IN
INDIFFERENT GASES.
APPLICATION FILED DEC. 15, 1910.
1,057,052.
Patented Mar. 25, 1913.
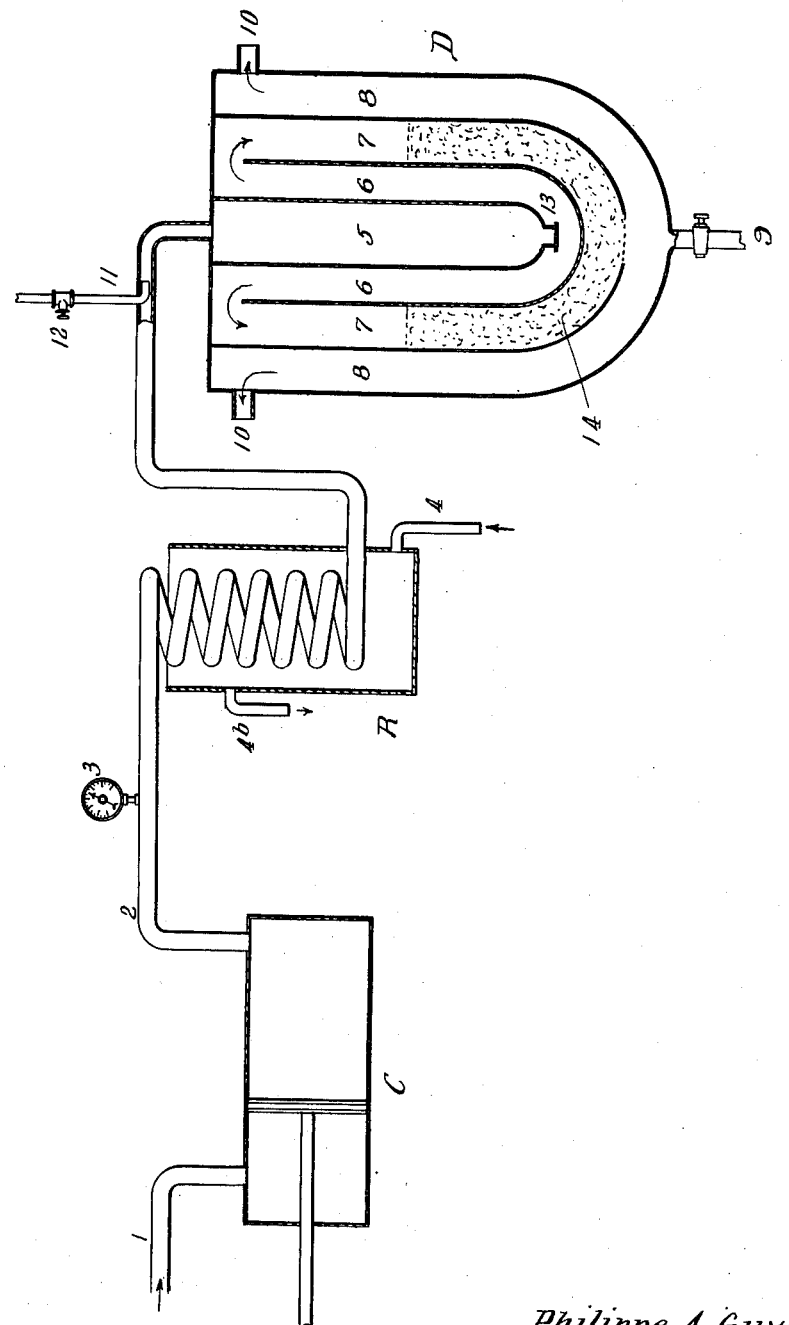

UNITED STATES PATENT OFFICE.

PHILIPPE AUGUSTE GUYE, OF GENEVA, SWITZERLAND.

PROCESS OF RECOVERING NITROUS VAPORS OR OXIDS OF NITROGEN DILUTED IN INDIFFERENT GASES.

1,057,052.     Specification of Letters Patent.     Patented Mar. 25, 1913.

Application filed December 15, 1910. Serial No. 597,535.

*To all whom it may concern:*

Be it known that I, PHILIPPE AUGUSTE GUYE, citizen of the Republic of Switzerland, residing at Geneva, Switzerland, have invented new and useful Improvements in Processes of Recovering Nitrous Vapors or Oxids of Nitrogen Diluted in Indifferent Gases, of which the following is a specification.

The recovery of oxids of nitrogen diluted in a great excess of indifferent gases, such as are obtained, for example, in the electrochemical manufacture of nitric acid by the action upon air of electric discharges (electric arcs or sparks), presents very great difficulties in practice, attempts to overcome which have been made in recent years by numerous improvements in the processes of absorption of the said oxids of nitrogen by water, sulfuric acid, alkaline liquids, etc. These processes, however, require costly installations, especially where the oxids of nitrogen to be recovered are diluted with large amounts of indifferent gases.

The present invention has for its object the direct recuperation of these dilute oxids of nitrogen, in the form of pure peroxid of nitrogen ($NO_2$ or $N_2O_4$) or of the peroxid mixed with other oxids of nitrogen ($N_2O_3$ and $NO$), which are generally found in what is called dilute nitrous vapors; it was especially devised for treating the gases from furnaces for oxidizing nitrogen, but it is obviously applicable to all similar mixtures constituting nitrous vapors of any chemical origin.

The present invention is based, 1st, on the cooling of the gaseous mixture containing oxids of nitrogen, to a temperature sufficiently low to produce precipitation in liquid or solid form; 2nd, on the employment of the simple expansion of the gaseous mixture to produce the desired cooling, without attaining the temperature at which the indifferent gases would liquefy; 3rd, on the employment of apparatus for the expansion and exchange of temperature so as to utilize as completely as possible, and with a minimum loss, all the cold produced by the expansion.

The industry of manufacturing liquefied gases has produced heat-interchangers which operate with an efficiency of about 95%. By making use of some such suitable heat-interchanger, a compression of from 5 to 6 atmospheres, followed by an expansion to 1 atmosphere, or in other words to normal atmospheric pressure, will suffice to lower the temperature to minus 100° C. throughout the gaseous mass containing the oxids of nitrogen. This lowering of the temperature is sufficient to cause the precipitation of about $\frac{9}{10}$ of the oxids of nitrogen diluted in the air in the proportion of 1% in volume of gas, NO. In very dilute nitrous vapors, there is a mixture of $N_2O_4$, $NO_2$, $N_2O_3$ and NO; all these gases are precipitated by cooling; in particular, NO combines with $NO_2$ to give $N_2O_3$. The degree of cooling of the gases necessary to produce the precipitation of $NO_2$ can only be stated in a general way, because it depends upon the concentration of $NO_2$ in the air. With pure $NO_2$ the precipitation is complete at minus 14 degrees; with gas containing about one per cent. of $NO_2$ the temperature should be reduced to about 100° C. below zero; for intermediate degrees of concentration, the temperature comes between the two stated limits. It may be said that the cooling of the gases varies from minus 14 degrees C., to minus 100 degrees C., with concentration of $NO_2$ varying from 100 per cent. to 1 per cent., if it is desired to recover the whole of the $NO_2$.

If the mixture of gas to be treated contains a sufficient excess of oxygen, the oxids of nitrogen being for the greater part in the form of $NO_2$ or $N_2O_4$ (liquefying at about minus 14° C.), the oxids of nitrogen will be deposited in solid form, but if the oxids of nitrogen are also partly in the form of $N_2O_3$ (which liquefies at minus 82° C.), a liquid mixture of $N_2O_4$ and $N_2O_3$ will be obtained. In the first case, it will be advantageous to provide two heat-interchangers in which the expansion of the gaseous mass to be treated will take place alternately; while one of said exchangers is operating, the solid peroxid of nitrogen $N_2O_4$ in the other will be recuperated, either by letting it warm up until the solid peroxid liquefies, or by recovering said peroxid by washing with a solvent of the peroxid $N_2O_4$, which itself remains liquid at these low temperatures and the boiling point of which differs sufficiently from that of $N_2O_4$ to enable the $N_2O_4$ and the solvent to be easily separated afterward. All solvents (pure or mixed) of the peroxid $N_2O_4$, congealing below minus 50° C. and volatile above plus 50° C. are suitable for this use.

The operation can be carried on continuously with a single heat-interchanger apparatus, provided a small quantity of a suitable volatile solvent is introduced regularly into the gases to be treated before they are expanded or into the expander itself; by the cooling, the solvent is condensed with the nitrous vapors to the liquid condition, and the mixture flows steadily from an orifice located in the lower part of the heat-interchanger. From this mixture the peroxid and the solvent are afterward separated by fractional distillation; the solvent is returned to the heat-interchanger apparatus. As a solvent suitable for the purpose may be mentioned here by way of example, the tetrachlorid of carbon, or a mixture of the same with chloroform or some saturated chlorated carbids, such as pentachlorethane, for instance.

It has been heretofore stated that a compression to 5 or 6 atmospheres followed by expansion in a heat interchanger to 1 atmosphere is sufficient, and I have found this degree of compression, followed by such expansion, to be advantageous and economical, and lay claim thereto. In the other aspects of the present invention, to wit, the introduction into the gases of a suitable solvent, such, for example, as those hereinbefore mentioned, and in that aspect of the invention which relates to the utilization of divided carbon as hereinafter explained, I desire it understood that I do not limit the invention in such aspects to this degree of compression and expansion, nor do I limit this invention, except in so far as it may be expressed in the claims, to cooling by expansion or by compression and expansion. In such other aspects of my said invention compression to 5 or 6 atmospheres, followed by an expansion to 1 atmosphere, is suitable and desirable, but, as stated, I do not limit the invention in those aspects thereto. For instance, the compression might be carried to 15-18 atmospheres and the expansion take place to 3 atmospheres, the desired lowering of temperature being thus obtained. This method of operation is especially advantageous if it is desired to produce as complete a precipitation as possible of the oxids of nitrogen, which will be the case, for example, if the nitrous vapors to be treated are very much diluted in air. The previous compression of the gases issuing from the nitrogen-oxidizing furnaces also presents the advantage that this compression accelerates the transformation of the lower oxids into peroxid. But the expansion may also be produced by lowering the pressure, from 1 atmosphere, for example, to a still lower pressure; in this case, the gaseous mixture to be treated, instead of being compressed before entering the heat-interchanger, will be drawn through said apparatus by a suitable suction pump, maintaining in said apparatus a sufficiently low pressure. This method of operation is especially advantageous if the gases issuing from the heat-interchanger apparatus must be returned into the nitrogen-oxidizing furnaces; for it is known from the works of Briner and Durand (*Comptes Rendus*, vol. 145, page 248) that the output of these furnaces is appreciably increased when the gases therein are at a pressure of about 150 millimeters of mercury.

If effective cooling means are available (a current of cold water, refrigerating machine, etc.) they may be used to cool the gases before they are expanded; the greater the capacity of the cooling means, the less the work of the expansion. Even in the absence of cooling means, the proportion of the pressures between which the expansion takes place may be varied within large limits so as only to condense all or part of the nitrous vapors.

The precipitation of the nitrous vapors may be accomplished by successive expansions, instead of by a single expansion—for example, the precipitation may be accomplished by an expansion of from 3 to 1 atmospheres followed by an expansion of from 1 to ¼ atmospheres.

Divided carbon, preferably finely divided, (bone black, wood charcoal, coacoanut charcoal, etc.) may be introduced into the apparatus in which the condensation of the oxids of nitrogen is effected by expansion. By reason of the well known property of this material of absorbing most gases, the condensation of the oxids of nitrogen can be effected at a temperature not so low as when the condensation is effected without the intervention of the divided carbon, and consequently the proportion between the higher pressure and the lower pressure to be adopted for the expansion may be smaller, which diminishes the mechanical work necessary to accomplish the condensation of the nitrous oxids. This manner of procedure may also be used in case there is introduced into the gases containing the nitrous oxids, in accordance with the foregoing description, a liquid solvent difficult to congeal. The condensation of the nitrous oxids being then accomplished at a temperature not so low, it suffices that the liquid shall not congeal at minus 25° C. For the final separation of the nitrous oxids this liquid (solvent) must boil at about plus 50° C. or higher.

The operation of the improved process is considerably simplified if gases free from moisture are used; in this case, all the apparatus (compressor, expander, exchanger) may be made of metal. If air is being used, it is also an advantage to free it of carbonic anhydrid, which precipitates partially with the oxids of nitrogen. These two conditions (elimination of water and carbonic anhydrid) are not, however, absolutely necessary. If the gases are humid, the apparatus will be constructed of or lined internally with some material not attacked by nitrous and nitric acids (stone-ware for example). If the oxids of nitrogen recovered contain a little carbonic acid gas $CO_2$, it is easily separable by distillation, in view of its great volatility relatively to the oxids of nitrogen.

The advantages of the new invention over previously proposed processes for recuperating nitrous vapors by cooling externally the apparatus through which pass the gases containing said vapors, are numerous. First, the new invention presents a great simplification of apparatus; secondly, it results in a great saving of power relatively to the usual methods of cooling; thirdly, it may be combined very advantageously with the best methods for producing oxids of nitrogen, especially with those which are based upon the action of the electric arc in gases at low pressure.

A suitable apparatus is diagrammatically shown in the accompanying drawing. In this drawing apparatus is shown organized to effect the cooling by compression and expansion, but, as before stated, my invention is not limited to this manner of cooling, nor to such apparatus except as may be particularly specified in the clauses of claim appended to this description.

In the said drawing C is a compressor. The gases drawn in at 1 are forced into the conduit 2 at a pressure of 5 to 6 atmospheres, for instance, the pressure being indicated by the gage 3. The gases remain at that pressure in the apparatus as far as the valve 13. Before arriving at the heat-interchanger D, the gases traverse a refrigerator R with outside circulation of cold water, which enters at 4 and comes out at $4^b$. Finally, through the injection tube 11, provided with a regulating valve 12, the solvent for the nitrous vapors is introduced (chloroform for instance). The solvent is introduced under a pressure a little greater than that indicated by the pressure gage 3. The heat-interchanger is composed of several cylindrical chambers concentrically arranged, four, for example, 5, 6—6, 7—7 and 8—8. At the lower part of the inner cylinder 5 there is a valve 13, regulated so as to open only under the operating pressure of the compressor, indicated by the pressure gage 3, say, for instance, under a pressure of 5 or 6 atmospheres. The gases expand in the annular spaces 6—6, 7—7, 8—8, as the arrows indicate. By the cooling resulting from the expansion the nitrous vapors condense with the volatile solvent in the lower part of the apparatus, where they are collected through the cock 9, while the air, in this way freed of the nitrous vapors, escapes by the openings 10—10.

If the condensation of the nitrous vapors is to be facilitated by means of divided carbon, the latter may be placed with advantage in the annular space 7—7, as is indicated at 14.

What I claim is:—

1. That improvement in a process for recovering oxids of nitrogen diluted in a mixture of nitrogen and oxygen founded on the precipitation of the nitrous vapor by cold, which consists in cooling the gases in the presence of a solvent having a congealing point lower than minus 50° C. and a boiling point above plus 50° C., and in separating the nitrous vapors condensed with the solvent in the cooling apparatus.

2. The herein described process of recuperating nitrous vapors in the presence of indifferent gases less easily liquefiable than said nitrous vapors, which consists in compressing said gases to substantially 6 atmospheres and then introducing the same into a heat-interchanger wherein the same are cooled by expansion.

3. The herein described process of recuperating nitrous vapors in the presence of indifferent gases less easily liquefiable than said nitrous vapors, which consists in causing the cooling of the gaseous mixture by expansion to produce precipitation of the nitrous vapors without causing liquefaction of the indifferent gases, treating the precipitated nitrous vapors with a solvent which congeals only at temperatures below minus 50° C. and is volatile only at temperatures above plus 50° C., and separating the solvent from the nitrous product by distillation.

4. The herein described process of recuperating nitrous vapors in the presence of indifferent gases less easily liquefiable than said nitrous vapors, which involves cooling the gaseous mixture by expansion and the introduction to said gases of a small quantity of a solvent congealing below minus 50° C., and volatile above plus 50° C.

5. The herein described process of recuperating nitrous vapors in the presence of indifferent gases less easily liquefiable than said nitrous vapors, which consists in causing the cooling of the gaseous mixture by expansion, introducing into said mixture before expansion a small quantity of a solvent congealing below minus 50° C., and volatile above plus 50° C., and separating the nitrous product from the solvent by distillation.

6. The herein described process of recuperating nitrous vapors in the presence of indifferent gases less easily liquefiable than said nitrous vapors, which consists in causing the cooling of the gaseous mixture by expansion, introducing into the gaseous mixture tetra chlorid of carbon, and subsequently separating the tetra chlorid of carbon from the nitrous product by distillation.

7. The herein described process of recuperating nitrous vapors in the presence of indifferent gases less easily liquefiable than said nitrous vapors, which consists in causing the cooling of the gaseous mixture by expansion, introducing into the gaseous mixture tetra chlorid of carbon and a chlorated carbid of the saturated series, and subsequently separating the solvent from the nitrous product by distillation.

8. The herein described process of recuperating nitrous vapors in the presence of indifferent gases less easily liquefiable than said nitrous vapors, which consists in causing the cooling of the gaseous mixture by expansion, introducing into the gaseous mixture carbon tetra chlorid and penta chlorethane, and subsequently separating the solvent from the nitrous product by distillation.

9. That step in a process of recovering, by cooling, nitrous vapors diluted in a mixture of nitrogen and oxygen which consists in condensing the nitrogen oxids in the presence of finely divided carbon.

10. That improvement in a process for recovery by cooling of the nitrous vapors diluted in a mixture of nitrogen and oxygen which consists in arranging finely divided carbon in the apparatus for condensing the nitrogen oxids and adding to the gases containing the nitrogen oxids a liquid solvent for oxids of nitrogen not attacked by these nitrogen oxids, freezing below minus 25° C. and volatile above plus 50° C.

11. The herein described process of recuperating nitrous vapors in the presence of indifferent gases less easily liquefiable than said nitrous vapors, which consists in cooling the gaseous mixture by expansion in the presence of finely divided carbon.

12. The herein described process of recuperating nitrous vapors in the presence of indifferent gases less easily liquefiable than said nitrous vapors, which consists in adding to the gases a solvent congealing below minus 25° C. and volatile above plus 50° C., and expanding the gases in the presence of finely divided carbon.

In testimony whereof I have hereunto set my hand in presence of two subscribing witnesses.

PHILIPPE AUGUSTE GUYE.

Witnesses:
L. H. MUNIER,
C. VULLIE.